(12) United States Patent
Bernard (10) Patent No.: US 8,266,839 B2
(45) Date of Patent: Sep. 18, 2012

(54) INSECT BAIT STATION WITH SNAP-OPEN CARTRIDGE AND CRADLE

(76) Inventor: Alan Bernard, Boca Raton, FL (US)

( * ) Notice: Subject to any disclaimer, the term of this patent is extended or adjusted under 35 U.S.C. 154(b) by 284 days.

(21) Appl. No.: 12/706,284

(22) Filed: Feb. 16, 2010

(65) Prior Publication Data

US 2010/0205850 A1    Aug. 19, 2010

Related U.S. Application Data

(60) Provisional application No. 61/152,288, filed on Feb. 13, 2009.

(51) Int. Cl.
*A01M 1/20* (2006.01)
(52) U.S. Cl. .......................................... 43/131
(58) Field of Classification Search ...................... 43/131
See application file for complete search history.

(56) References Cited

U.S. PATENT DOCUMENTS

| | | | | |
|---|---|---|---|---|
| 794,637 A * | 7/1905 | Park et al. | ......... | 43/131 |
| 890,430 A * | 6/1908 | Mann | ......... | 43/131 |
| 1,804,891 A * | 5/1931 | Newman | ......... | 43/131 |
| 1,820,186 A * | 8/1931 | Gaskins | ......... | 43/131 |
| 2,004,841 A * | 6/1935 | Vinson | ......... | 43/131 |
| 2,009,305 A * | 7/1935 | Vinson | ......... | 43/131 |
| 2,359,341 A * | 10/1944 | Weil | ......... | 43/131 |
| 2,650,451 A * | 9/1953 | Karstedt | ......... | 43/131 |
| 2,651,138 A * | 9/1953 | Malloy | ......... | 43/131 |
| 2,683,326 A * | 7/1954 | Gardner et al. | ......... | 43/131 |
| 2,683,953 A * | 7/1954 | Hopkins | ......... | 43/131 |
| 3,040,470 A * | 6/1962 | Kanin | ......... | 43/131 |
| 3,094,805 A * | 6/1963 | Luck | ......... | 43/131 |
| 3,177,610 A * | 4/1965 | Smith | ......... | 43/131 |
| 3,643,371 A * | 2/1972 | Gordon | ......... | 43/131 |
| 3,828,464 A * | 8/1974 | Peace | ......... | 43/131 |
| 4,026,064 A * | 5/1977 | Baker | ......... | 43/131 |
| 4,182,070 A * | 1/1980 | Connelly | ......... | 43/131 |

(Continued)

FOREIGN PATENT DOCUMENTS

EP    1270021 A1 *  1/2003

(Continued)

*Primary Examiner* — Darren W Ark
(74) *Attorney, Agent, or Firm* — Malin Haley DiMaggio Bowen & Lhota, P.A.; Mark D. Bowen (57) ABSTRACT

An insect bait station that is pre-filled with a suitable bait, preferably a combination of attractant and toxicant, and is activated for use by a snap-open closure that exposes an entrance/exit disposed on the upper part of the bait station for providing insects with access to the bait. The entrance is disposed above the level of the contained bait and an internal ramp structure allows insects to traverse downward to the bait from the opening, as well as upward to exit the bait station. Providing a ramp structure ensures continual access even as the level of the bait within the station drops, due to evaporation, consumption, spillage etc. By enabling egress from the bait station, the ramp further prevents the accumulation of dead insects inside the bait station, the scent of which, would nullify effectiveness. A cradle is provided for receiving the bait station in two alternate configurations, namely a non-activated and sealed stowed configuration and an activated and un-sealed deployed configuration. The cradle further provides a structure that stabilizes the bait station while providing additional mounting options, and a ramp that leads upward from the underlying surface to the bait station entrance. The cradle may be structured such that the bait station is activated by opening of the closure upon insertion of the bait station into the cradle.

4 Claims, 6 Drawing Sheets

U.S. PATENT DOCUMENTS

| | | | | |
|---|---|---|---|---|
| 4,619,071 A | * | 10/1986 | Willis | 43/131 |
| 4,648,201 A | * | 3/1987 | Sherman | 43/131 |
| 4,765,091 A | * | 8/1988 | Sherman | 43/131 |
| 4,782,621 A | * | 11/1988 | Wissman | 43/131 |
| 4,793,093 A | * | 12/1988 | Gentile | 43/131 |
| 4,823,506 A | * | 4/1989 | Demarest et al. | 43/131 |
| 4,831,775 A | * | 5/1989 | Sherman | 43/131 |
| 4,833,819 A | * | 5/1989 | Sherman | 43/131 |
| 4,835,902 A | * | 6/1989 | Sherman | 43/131 |
| 4,841,669 A | * | 6/1989 | Demarest et al. | 43/131 |
| 4,905,407 A | * | 3/1990 | Sherman | 43/131 |
| 5,033,229 A | * | 7/1991 | Demarest et al. | 43/131 |
| 5,446,992 A | * | 9/1995 | Stewart | 43/131 |
| 5,501,033 A | * | 3/1996 | Wefler | 43/131 |
| 5,548,922 A | * | 8/1996 | Wefler | 43/131 |
| 5,775,026 A | * | 7/1998 | Pearce et al. | 43/132.1 |
| 5,802,761 A | * | 9/1998 | Demarest et al. | 43/131 |
| 5,806,237 A | * | 9/1998 | Nelson et al. | 43/131 |
| 5,875,586 A | * | 3/1999 | Ballard et al. | 43/131 |
| 5,943,816 A | * | 8/1999 | Hyatt et al. | 43/131 |
| 5,943,817 A | * | 8/1999 | Miller | 43/131 |
| 5,953,854 A | * | 9/1999 | Hyatt | 43/131 |
| 5,966,863 A | * | 10/1999 | Payton et al. | 43/131 |
| 5,983,558 A | * | 11/1999 | Las et al. | 43/131 |
| 6,041,542 A | * | 3/2000 | Payton et al. | 43/131 |
| 6,079,151 A | * | 6/2000 | Bishoff et al. | 43/131 |
| 6,189,259 B1 | * | 2/2001 | Soller | 43/131 |
| 6,195,933 B1 | * | 3/2001 | Woodruff | 43/131 |
| 6,202,341 B1 | * | 3/2001 | Bernard | 43/131 |
| 6,216,384 B1 | * | 4/2001 | Dickson et al. | 43/131 |
| 6,272,791 B1 | * | 8/2001 | Pleasants | 43/131 |
| 6,343,434 B1 | * | 2/2002 | Petti | 43/131 |
| 6,370,813 B1 | * | 4/2002 | Nelson et al. | 43/131 |
| 6,502,348 B2 | * | 1/2003 | Bernard | 43/131 |
| 6,532,696 B2 | * | 3/2003 | Clark et al. | 43/131 |
| 6,618,983 B1 | * | 9/2003 | Spragins | 43/131 |
| 6,651,378 B2 | * | 11/2003 | Baker | 43/131 |
| 6,655,079 B1 | * | 12/2003 | Bernard et al. | 43/131 |
| 6,871,444 B1 | * | 3/2005 | Bernard et al. | 43/131 |
| 7,043,873 B2 | * | 5/2006 | Westphal et al. | 43/131 |
| 7,204,054 B2 | * | 4/2007 | Mayo et al. | 43/131 |
| 7,310,908 B2 | * | 12/2007 | Bernard et al. | 43/131 |
| 7,434,351 B2 | * | 10/2008 | Bette | 43/131 |
| 7,980,023 B2 | * | 7/2011 | Nelson et al. | 43/131 |
| 8,028,468 B1 | * | 10/2011 | Walsh et al. | 43/131 |
| 8,156,684 B2 | * | 4/2012 | Kirkland et al. | 43/131 |
| 2002/0069579 A1 | * | 6/2002 | Hyatt et al. | 43/131 |
| 2003/0145511 A1 | * | 8/2003 | Finn et al. | 43/131 |
| 2004/0079025 A1 | * | 4/2004 | Snell et al. | 43/131 |
| 2004/0134121 A1 | * | 7/2004 | Bianchini et al. | 43/131 |
| 2008/0313952 A1 | * | 12/2008 | Pettigrew et al. | 43/131 |
| 2009/0229170 A1 | * | 9/2009 | Gaibotti | 43/131 |
| 2010/0319239 A1 | * | 12/2010 | Kirkland et al. | 43/131 |
| 2010/0325940 A1 | * | 12/2010 | Pryor et al. | 43/131 |
| 2011/0258907 A1 | * | 10/2011 | Endepols et al. | 43/131 |

FOREIGN PATENT DOCUMENTS

| | | | |
|---|---|---|---|
| JP | 11318305 A | * | 11/1999 |
| JP | 2001136888 A | * | 5/2001 |
| JP | 2002209499 A | * | 7/2002 |
| JP | 2002320437 A | * | 11/2002 |
| JP | 2003081707 A | * | 3/2003 |
| JP | 2003225041 A | * | 8/2003 |
| JP | 2004261152 A | * | 9/2004 |
| JP | 2005058207 A | * | 3/2005 |
| JP | 2007117086 A | * | 5/2007 |
| JP | 2010187557 A | * | 9/2010 |
| JP | 2010273630 A | * | 12/2010 |
| JP | 2012051649 A | * | 3/2012 |
| WO | WO 2005014061 A1 | * | 2/2005 |
| WO | WO 2005043998 A1 | * | 5/2005 |

* cited by examiner

INSECT BAIT STATION WITH SNAP-OPEN CARTRIDGE AND CRADLE

CROSS REFERENCE TO RELATED APPLICATIONS

This application claims the benefit of provisional U.S. Patent Application Ser. No. 61/152,288, filed on Feb. 13, 2009.

STATEMENT REGARDING FEDERALLY SPONSORED RESEARCH OR DEVELOPMENT

Not Applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to insect bait stations for use in exterminating insects, and more particularly to a prefilled bait station that is easily opened and activated for use upon insertion within a cradle.

2. Description of the Background Art

Human populations have long encountered problems co-existing with various insects, particularly ants. There are more than ten thousand species of ants, a number of which infest structures, lawns, parks, and other areas frequented by humans, as well as agriculture and crops. The various species of ants vary widely in many respects including size, color, shape, distribution, food preference, and nest locations. Many other species of ants routinely disrupt activities in homes, offices, parks, and protect homopteran pests that can impact agriculture crops and ornamental plantings. As a result, controlling insect populations is therefore necessary.

A primary means of pest control involves the use of toxicants, particularly liquid poison. The spraying of liquid poison is a common method of pest control. Spraying liquid poison, however, involves a number of inherent disadvantages. A primary disadvantage involves the risk of exposing humans to the toxic chemical formulations. Furthermore, spraying poison is often harmful to the environment and often causes damage to vegetation and other animal species in addition to the targeted pest population. In addition, liquid poison that has been applied by spraying often degrades over time and/or is washed away by rain or irrigation water thereby reducing effectiveness and requiring repeated treatment and/or the use of greater quantities. Toxicants can also leach into the soil and end up contaminating the ground water.

For these and other reasons it has been found preferable to contain liquid or gel toxicants in bait station structures that contain the poison while providing access to insects. The background art reveals a number of attempts directed to pest control. The following patents provide examples of these attempts.

| | |
|---|---|
| 4,648,201 | Sherman |
| 4,782,621 | Wissman |
| 4,793,093 | Gentile |
| 4,823,506 | Demarest et al. |
| 4,841,669 | Demarest et al. |
| 5,446,992 | Stewart |
| 5,501,033 | Wefler |
| 5,775,026 | Pearce et al. |
| 5,802,761 | Demarest et al. |
| 5,875,586 | Ballard et al. |
| 5,943,816 | Hyatt et al. |
| 5,943,817 | Miller |
| 5,953,854 | Hyatt |
| 5,983,558 | Las et al. |
| 6,041,542 | Payton et al. |
| 6,189,259 | Soller |
| 6,195,933 | Woodruff |
| 6,216,384 | Dickson et al. |
| 6,532,696 | Clark III, et al. |

U.S. Pat. No. 4,793,093, issued to Gentile, discloses a feeding station for vermin that allows for ingress of the vermin to feed on poisoned bait held at a central portion therein. The bait is contained within a central well and ingress is facilitated by an inclined ramp leading to the chamber. A cover is joined to the top of the base member to cover the central well holding the poisoned bait.

U.S. Pat. Nos. 4,823,506 and 4,841,669, issued to Demarest et al., each disclose an insect bait device for exterminating crawling insects. The devices comprise first and second housing portions joinable to form a housing that defines generally unobstructed entry into the device by an insect. U.S. Pat. No. 5,802,761, also issued to Demarest et al., discloses a bait station including a base defining a bait-cup and a cover fastened to the base. The cover and base cooperate to form a door and walkway to admit targeted insects to enter the bait station thus gaining access to the bait cup.

U.S. Pat. No. 5,501,033, issued to Wefler, discloses a liquid delivery bait station having two reservoirs and fluid transfer systems to allow sequential delivery of two liquids. The liquids are preferably an insect attractant that is first delivered into an absorbent feeding pad and an insect toxicant that is next delivered to the absorbent pad.

U.S. Pat. No. 5,775,026, issued to Pearce et al., discloses an insect bait station for attracting and killing insects that comprises a substantially flat configuration with insecticide formulated as a solid coating on the surface of a sheet of moisture free material, and one or more breakable ampoules containing an attractant composition. The ampoules are held in a compressible portion of the housing permitting them to be manually broken to discharge their contents on command thereby releasing attractant vapors.

U.S. Pat. No. 5,875,586, issued to Ballard et al., discloses a refillable liquid bait station formed to allow access by insects, but not by larger animals. The bait station includes a transparent housing that protects the liquid bait from wind and rain and which further prevents leakage if the bait station is tumbled and/or placed in an incorrect position by use of a series of inner walls and chambers.

U.S. Pat. No. 5,943,816, issued to Hyatt et al., discloses an insect bait station for delivering a liquid toxicant. The bait station includes a reservoir, a feeding disk with capillary feeding pores, and a base that seals the feeding pores when configured in a closed position. U.S. Pat. No. 5,953,854, also issued to Hyatt, discloses a spill resistant granular bait station having a tunnel entrance leading to an interior bridged member having an inner wall leading from the bottom surface to an inner surface having an access opening in the bridge member leading to a bait source contained within the station. A cover defines a recessed portion thereon closely cooperating with the access opening in the base.

U.S. Pat. No. 6,041,542, issued to Payton et al., discloses a spill-resistant liquid bait station for dispensing liquid bait. The liquid bait is contained in a reservoir at the bottom of the bait station base and a lid is secured over the end of the base. The interior of the bait station is configured for containing the liquid bait if the bait station is inverted. Insects enter the bait station through one or more access ports and then travel through an interior passageway to the liquid bait.

U.S. Pat. No. 6,189,259, issued to Sailer, discloses an insect bait-and-switch liquid delivery apparatus for the control of insects. The apparatus includes a reservoir defining a first chamber containing a liquid attractant and a second chamber containing a liquid toxicant. A first feeding station is provided in the first chamber and a second feeding station is provided in the second chamber. A passageway connects the first and second chambers, and an access port is disposed to initially prevent or limit access of an insect to the second feeding station during an initial feeding period and the subsequently enable access to the second feeding station via the passageway after the initial feeding period.

U.S. Pat. No. 6,195,933, issued to Woodruff, discloses a bait station for delivery of liquid insecticide formed from a base having at least one feeding station and a reservoir for storing liquid beneath the base. The insecticide is transferred by capillary action from the reservoir to the feeding station via a connecting tube.

U.S. Pat. No. 6,216,384, issued to Dickson et al., discloses an insect bait station having a continuous outer wall leading from a base to an upper annular surface having a central axial recessed opening therein leading down to a bait source contained in the interior of the station. The interior of the station defines an inverted conical concave part for concentrating the bait to the lowest point of the cone in proximity with an opening in the bottom of the central axial recessed opening.

U.S. Pat. No. 6,532,696, issued to Clark III, et al., discloses a holder for liquid insect bait comprising a sealed container having a bottom portion defining contours that form reservoirs and channels wherein liquid bait may be located and flow. The device is deployed by orienting the device in a vertical configuration whereby the liquid bait flows to specified internal reservoirs, cutting an entrance opening in the container at a specified location, and placing the container in a horizontal configuration wherein the liquid bait flows to additional reservoirs accessible to the insects.

The present inventor has contributed significant advancements in the art of insecticide delivery using insect bait stations. In U.S. Pat. No. 6,871,444, the present inventor discloses a user activated, disposable insect bait station particularly adapted for use with liquid bait, including attractants and toxicants. The bait station is formed as a sealed container fabricated from two primary parts, an upper half and a lower half sealingly connected along common peripheral edges. The bait station includes first and second internal chambers. The first internal chamber contains a liquid bait reservoir wherein all of the liquid bait is stored prior to use, and the second internal chamber is adapted to function as an entrance providing insects access to the second chamber. Manual manipulation of the bait station is required for activation whereby a frangible seal is broken placing the first and second chambers in fluid communication thereby allowing liquid bait to flow into the second chamber. Further advancements relating to the bait station are disclosed in U.S. Pat. Nos. 7,310,908, 6,655,079, 6,502,348, and 6,202,341, all in the name of the present inventor. The patents identified in this paragraph are incorporated herein by reference.

While the insect bait stations disclosed in the art are generally suitable for the purposes for which they are intended, many of the bait stations are difficult to deploy, and fail to provide sufficient access to the bait, particularly as the level of the bait within the station changes over time due to evaporation, consumption, etc. A further disadvantage present in the bait station art is the failure to provide easy ingress as well as egress. The failure to provide sufficient egress is particularly problematic as it results in the accumulation of dead insects within the bait station. It has been found that dying insects give off a chemical scent warning that deters other insects from the area thereby rendering the bait station prematurely ineffective. Accordingly, there exists a need for an improved insect bait station that is prefilled, easily deployed without exposing persons to harmful chemicals, and provides improved ingress and egress even as the level of the bait changes.

BRIEF SUMMARY OF THE INVENTION

The present invention overcomes the limitations in the art by providing an insect bait station having a pre-filled and sealed cartridge and a cradle that receives the cartridge in both deployed and non-deployed configurations. The cartridge is pre-filled with a suitable bait, preferably a combination of attractant and toxicant, and is activated for use by a breaking a frangible seal using a snap-open tab closure that exposes an opening that functions as entrance/exit (hereinafter "entrance") disposed on the upper part of the bait station for providing insects with access to the bait. The entrance is disposed above the level of the contained bait and an internal ramp structure allows insects to traverse downward to the bait from the entrance, as well as upward to exit the bait station. Providing a ramp structure ensures that insects have continual access to the bait even as the level of the bait within the station drops, due to evaporation, consumption, spillage etc. By enabling egress from the bait station, the ramp further prevents the accumulation of dead insects inside the bait station, the scent of which, would nullify effectiveness.

A cradle is preferably provided for receiving the bait station in two alternate configurations, namely an inactivated/sealed configuration prior to deployment and an activated/unsealed deployed configuration. The cradle further provides a structure that stabilizes the bait station while providing additional mounting options. The cradle defines a channelized path leading upward from the bottom thereof to the bait station entrance that functions to guide insects to the entrance. The path is preferably slightly inclined to allow the insects to move easily from the surface beneath the bait station upward to the entrance. The cradle further includes a peripheral shoulder along the top portion thereof for directing insects toward the entrance. The bait station cradle preferably is structured to maintain the tab open upon insertion of the cartridge into the cradle. The cradle is further adapted to provide secured mounting by using a ground anchor or adhesive patch.

Accordingly, it is an object of the present invention to provide an improved pre-filled insect bait station.

Another object of the present invention is to provide such a bait station that is simple to activate.

Still another object of the present invention is to provide such a bait station wherein access to the bait is improved by the use of one or more ramps.

Still further objects and advantages will become apparent from a consideration of the ensuing description and drawings.

DETAILED DESCRIPTION OF THE INVENTION

Figure 1:
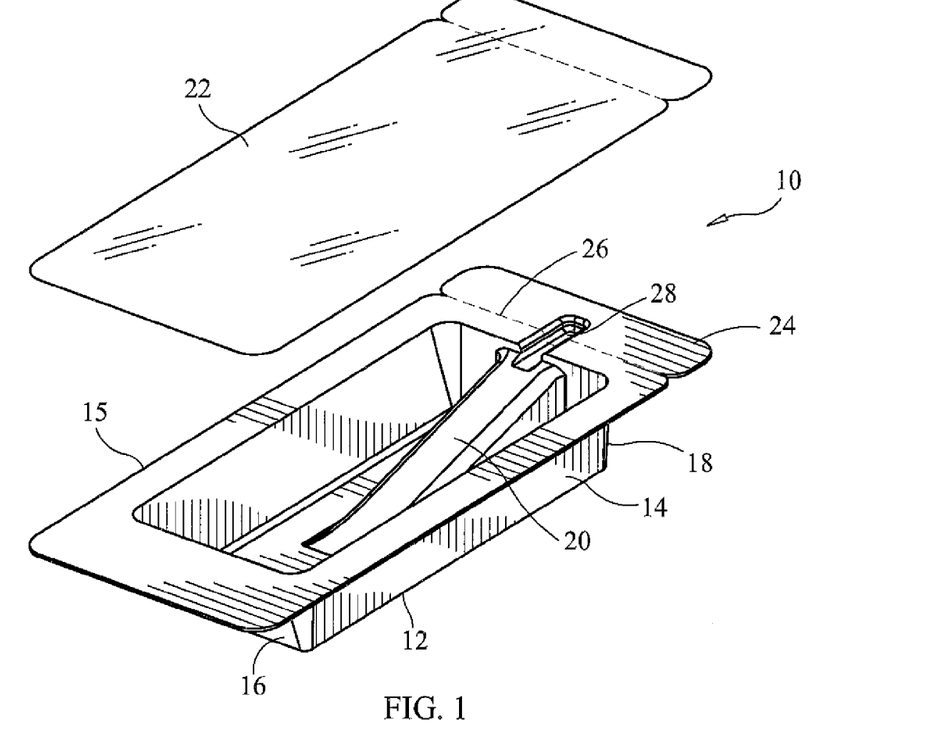
FIG. 1 is an exploded top perspective view of a cartridge for a bait station in accordance with the present invention.
Figure 2:
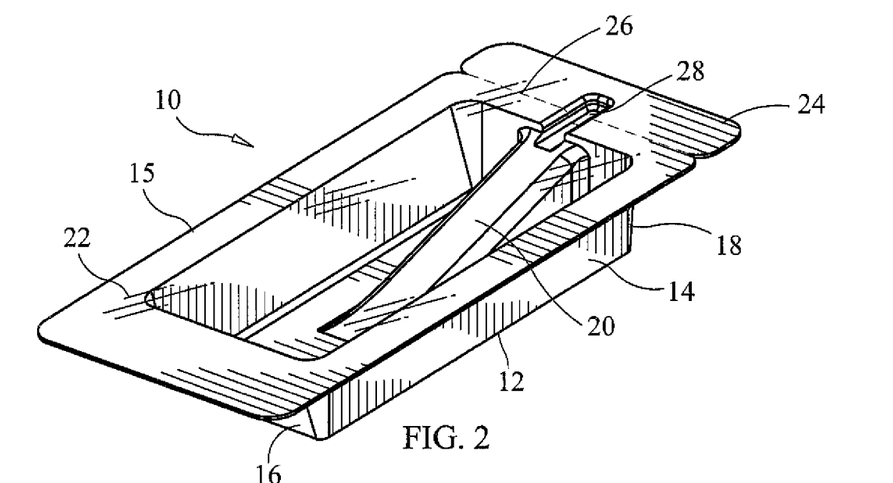
FIG. 2 is top perspective view thereof.
Figure 3:
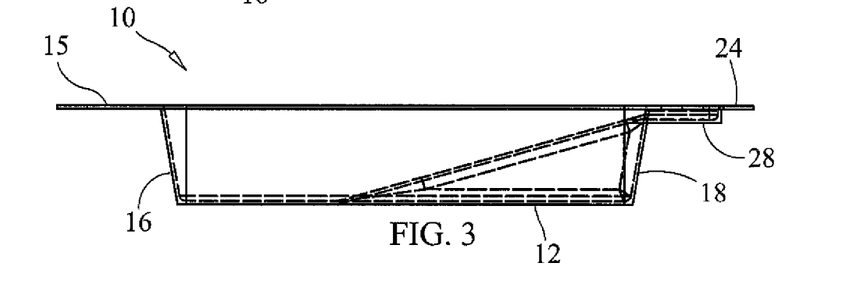
FIG. 3 is a side view thereof.
Figure 4:
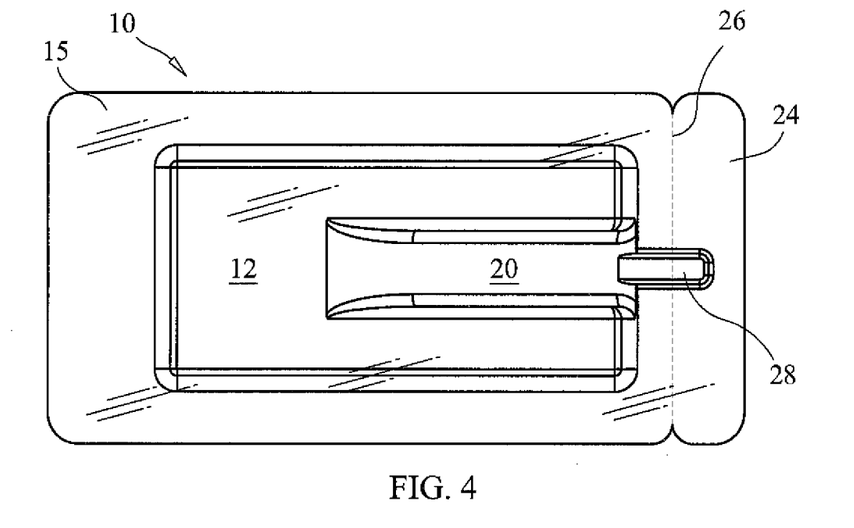
FIG. 4 is a top view thereof.
Figure 5:
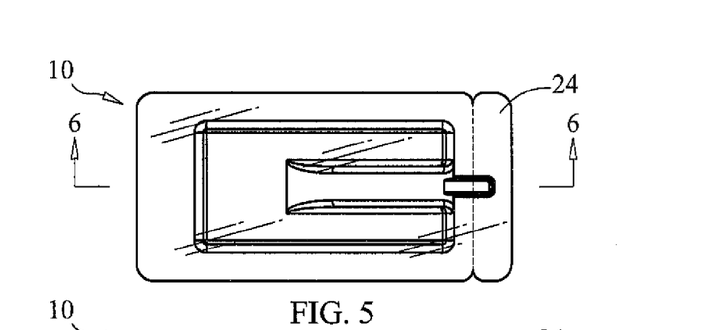
FIG. 5 is a top view of a cartridge in a non-activated configuration.
Figure 6:
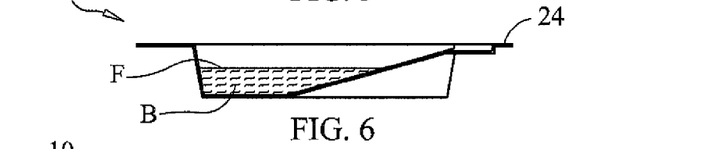
FIG. 6 is a side sectional view thereof taken along line 6-6 in FIG. 5.
Figure 7:
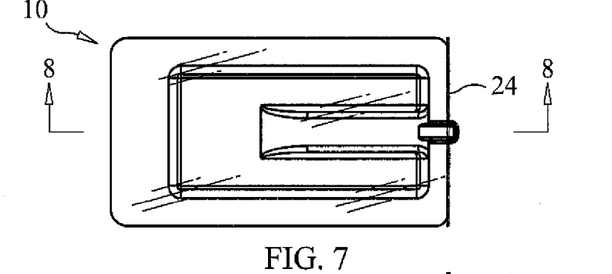
FIG. 7 is a top view of a cartridge illustrating the breaking of the frangible seal during activation.
Figure 8:
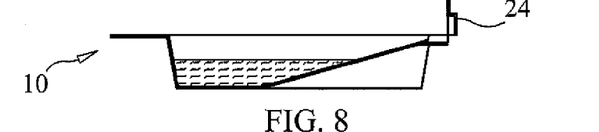
FIG. 8 is a side sectional view thereof taken along line 8-8 in FIG. 7.
Figure 9:
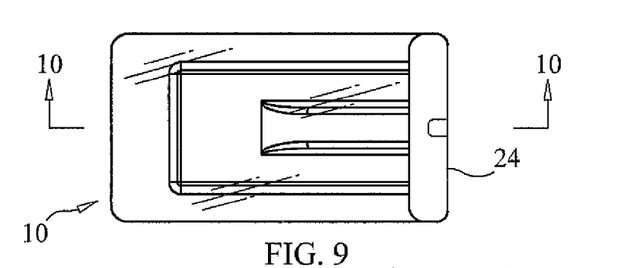
FIG. 9 is a top view of a cartridge in an activated configuration.
Figure 10:
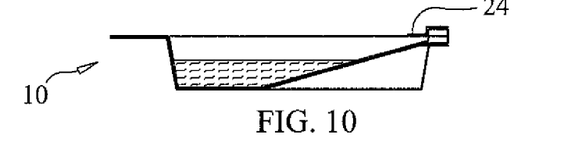
FIG. 10 is a side sectional view thereof taken along line 10-10 in FIG. 9.

With reference to the drawings, FIGS. 1-15 depict an insect bait station in accordance with the present invention. Turning first to FIGS. 1-10, there is disclosed cartridge, generally referenced as 10, in accordance with the preferred embodiment. Cartridge 10 comprises a sealed container defining an internal volume that is pre-filled with a suitable, preferably flowable, insect bait, such as an composition including an attractant and a toxicant. Cartridge 10 comprises a body having a bottom 12, opposing raised side walls 14 defining a open top portion forming a peripheral projecting flange 15, a first end 16, and a second end 18. The body may be generally rectangular (as shown) or any other suitable shape. Cartridge 10 further includes a ramp 20 that originates in proximity to the top portion of the second end 18 and extends at an incline downward so as to terminate by blending into the bottom 12 of cartridge 10. It is important that ramp 20 extend downward to provide insects with ready access to the bait as the fill level drops due to evaporation, spillage, etc. Bait station body 10 is preferably made of plastic, and preferably fabricated by a thermoforming process wherein the cartridge is formed, filled, and sealed. Fabricating the bait station cartridge by such a process includes forming the cartridge, filling the cartridge with a suitable flowable bait, such as a combination attractant and toxicant, and sealing the open top with a liquid impermeable sheet material 22 sealing secured to flange 15. Sheet material 22 when secured in sealing relation with peripheral projecting flange 15 along the uppermost surface of cartridge 10 as illustrated in FIGS. 1 and 2. It is important that sheet material be resistant to ultraviolet radiation so as to shield the contained bait from the effects of UV rays. Accordingly, sheet material 22 preferably comprises a metal composite film that provides UV protection.

A first significant aspect of the present invention relates to adapting the second end 18 with a projecting tab 24 that functions as an openable closure for providing access to the bait station contents. Tab 24 is preferably connected to the top portion of the main cartridge body by a hinge line 26 forming a frangible seal. Hinge line 26 may represent a living hinge, or merely a scored line or line of reduced thickness. A recessed channel 28 is defined along the top portion of tab 24 and traverses living hinge 26. Upon manufacture tab 24 projects generally horizontally (e.g. along the plane formed by the bait station top). A frangible seal is formed at channel 28 along the living hinge line 26. In this configuration the entrance to the bait station is sealed and the bait station is inactive. Prior to deployment, bait station 10 is configured to an activated state by pivoting tab 24 upward and 180-degrees about hinge line 26 thereby breaking the frangible seal so as to result in the formation of an entrance opening 25 in proximity to the top portion of second end 18. While the present invention contemplates pivoting tab 24 a full 180-degrees in a preferred embodiment, lesser degrees of pivotal movement, such as 90-degrees, 45-degrees, etc. are considered within the scope of the present invention. In addition, alternate twist-off tabs are also considered within the scope of the present invention. FIGS. 5-10 illustrate activation of cartridge 10 by pivotal movement of tab 24 about pivot line 26. Cartridge 10 is pre-filled with insect bait, referenced as "B" whereby the bait includes a surface defining a fill level, referenced as "F". As noted above, the fill level will drop over time as the bait evaporates. More particularly, the folding over of tab 24 results in a portion of channel 28 to be invertedly disposed over the remaining portion of channel 28 thereby forming an opening that functions as an entrance.

A second significant aspect of the present invention involves providing an entrance that is disposed above the level of the contained bait in combination with an internal ramp 20 to allow insects to traverse downward to the bait from the opening, as well as to provide an upward path to exit the bait station. As noted above, ramp 20 thus ensures continual access even as the level of the bait within the station drops, due to evaporation, consumption, spillage etc. By further enabling egress from the bait station, the ramp prevents the accumulation of dead insects, such as drowned insects, inside the bait station. This feature is significant since dead or dying insects give off a chemical signal that deters other insects from entering the area. Such signals would nullify the effectiveness of the bait station.

Figure 11:
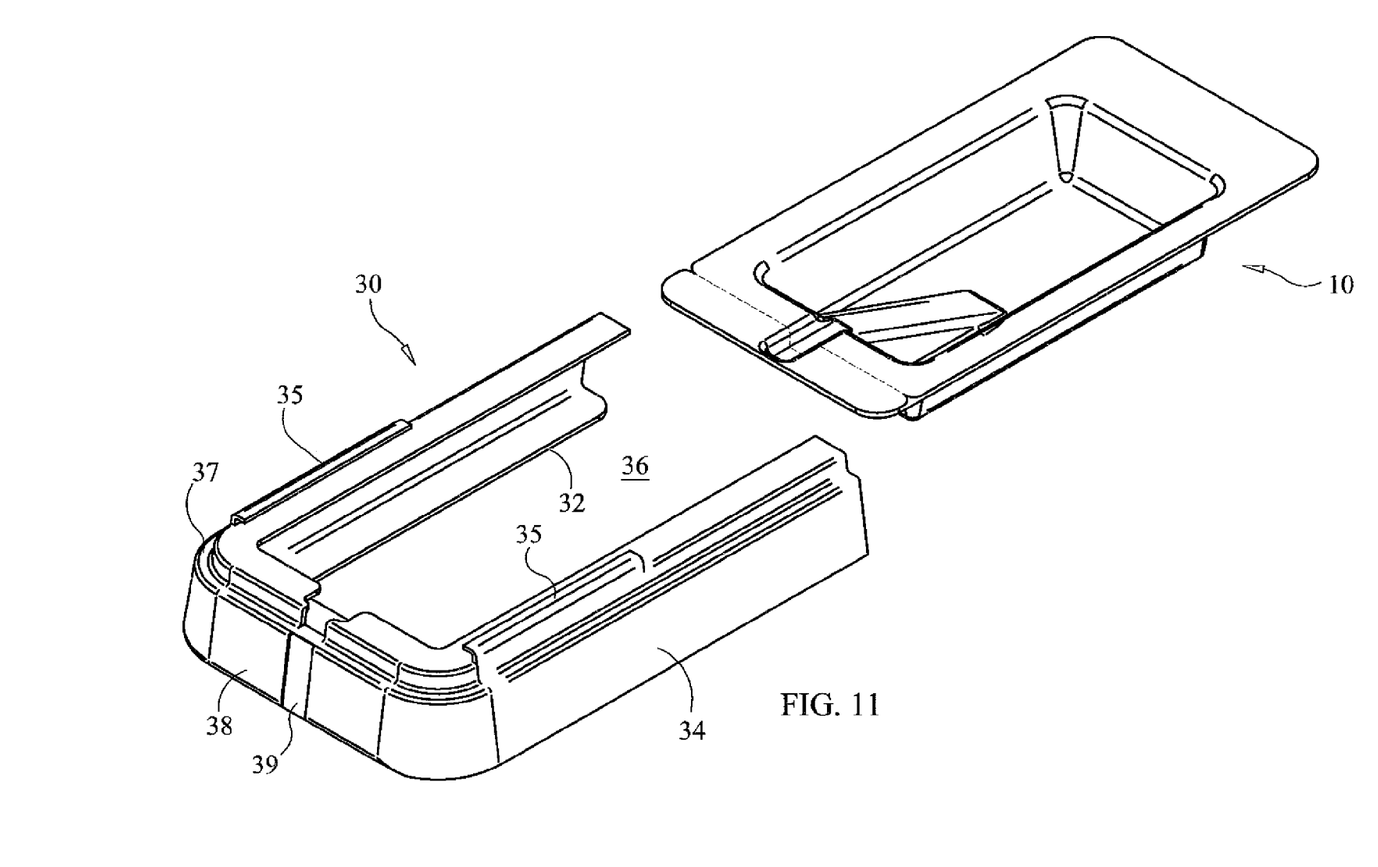
FIG. 11 is a top exploded perspective view of a cartridge and cradle for an insect bait station in accordance with the present invention.
Figure 12:
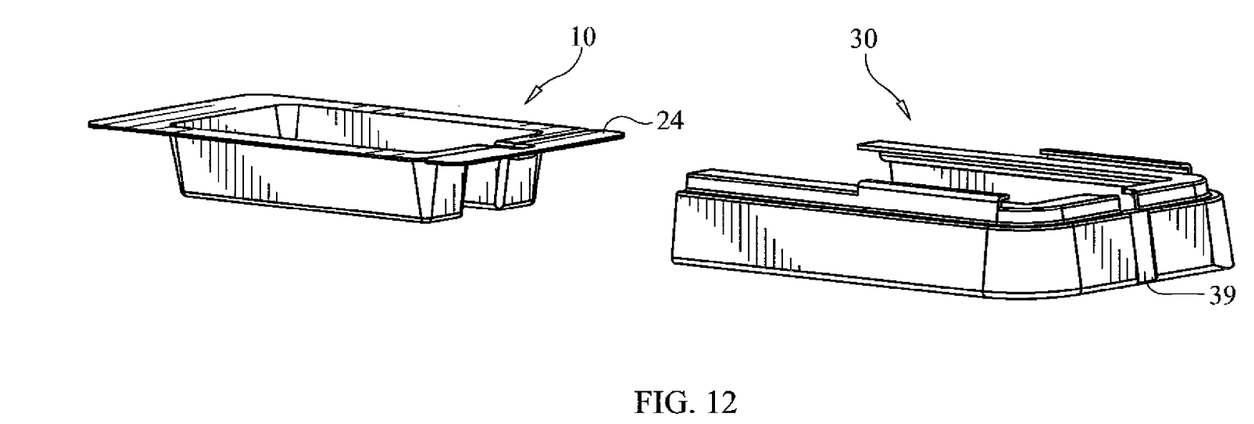
FIG. 12 is another top perspective exploded view illustrating a cartridge in a non-activated configuration in relation to a cradle.
Figure 13:
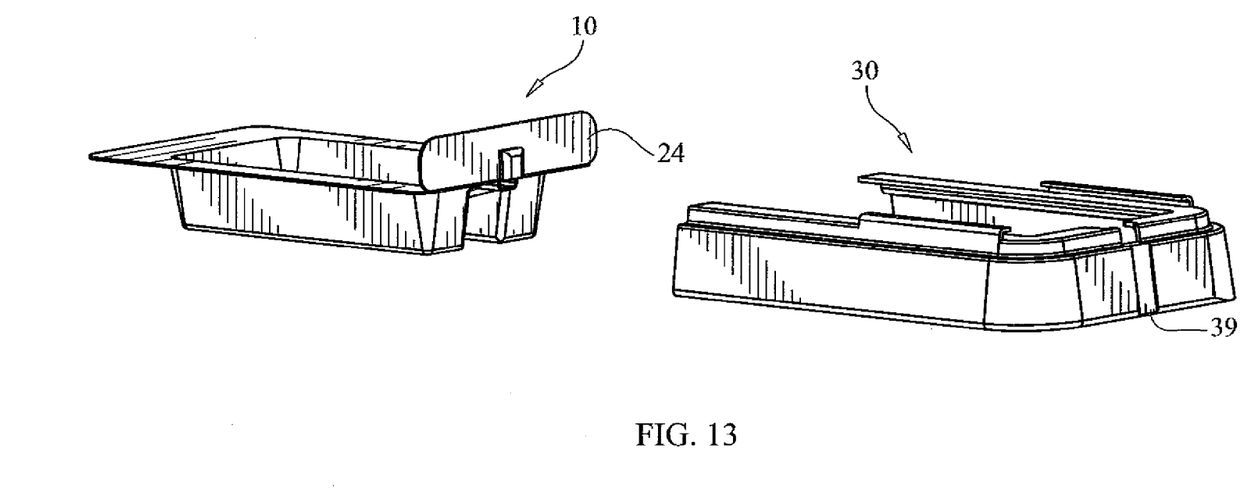
FIG. 13 is a view thereof illustrating the cartridge in an activated configuration in relation to a cradle.
Figure 14:
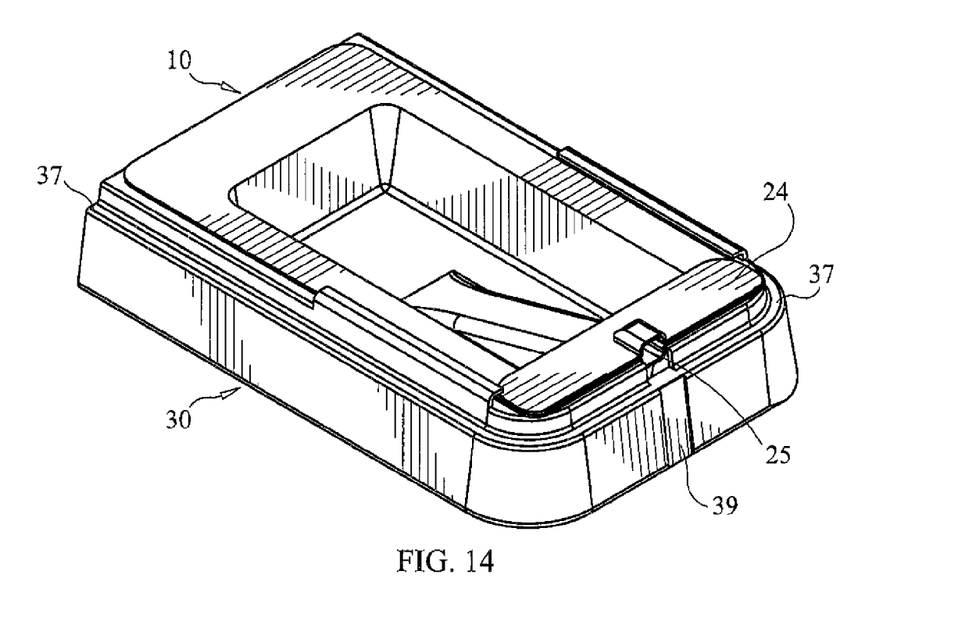
FIG. 14 is a view thereof illustrating an activated cartridge received in engagement with the cradle.
Figure 15:
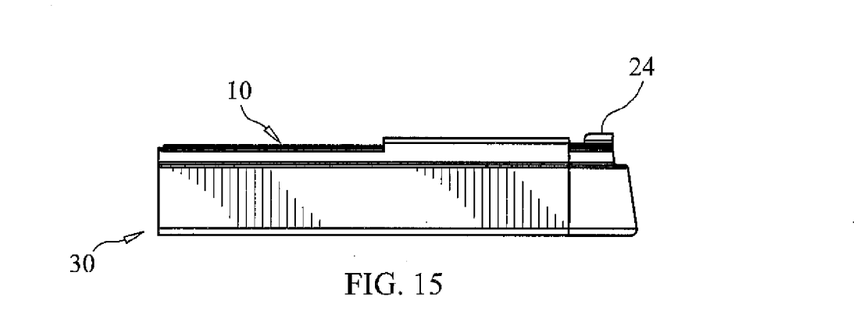
FIG. 15 is a side view thereof.

A third significant aspect of the present invention relates to the provision of a cradle, generally referenced as 30, for use in combination with bait cartridge 10 by slidingly receiving cartridge 10 nested therein as illustrated in FIGS. 11-15. FIG. 11 provides a top perspective illustration of a bait cartridge 10 in exploded relation with cradle 30. Cradle 30 comprises a generally U-shaped structure having a bottom 32, opposing sides 34, an open first end 36, and a second end 38 having a wall forming a front. Opposing sides 34 and second end 38 are preferably inclined (as opposed to vertical) to allow insects to more easily scale the structure. Cradle second end 38 includes an upwardly inclined wall defining a recessed channel 39 that functions to provide a pathway for insects to traverse from the bottom portion of cradle 30 to the top portion thereof. Recessed channel 39 terminates in proximity to the entrance of an activated cartridge 10 inserted within cradle 30. A peripheral shoulder or ridge 37 provides a horizontal surface that allows insects to traverse along the cradle structure such that insects that climb up either of the opposing sides 34 are provided with a guide to the entrance of the bait station at the second end 38 of cradle 30. Cradle 30 further includes a pair of upward and inwardly projecting opposing flanges 35 that define slots into which flanges 15 of cartridge 10 may be insertedly received.

Cradle 30 is capable of receiving cartridge 10 in two alternate configurations, namely an inactive stowed configuration and an active deployed configuration. Cradle 30 is preverably fabricated from a material that resistant to penetration of ultraviolet ("UV") radiation and thus functions to shield the cartridge 10, and particularly prevent degradation of the contained bait, from the effects of UV radiation. More particularly, bait cartridge 10 may be received within cradle 30 with tab 24 in the sealed configuration, namely generally horizontally disposed and/or parallel with the plane of the top of the cartridge, with the frangible seal unbroken such that the bait station entrance is closed in a stowed configuration. This configuration is particularly important to minimize size for shipping. Once received by the user, cradle 30 also functions to receive an activated cartridge 10 therein when deployed. First the user removes cartridge 10 from its stowed configuration within cradle 30, breaks the frangible seal by rotating tab 24 about fold line 26 a full 180-degrees as illustrated in FIGS. 5-10. With tab 24 folded back upon the top of the cartridge, the user re-inserts cartridge 10 such that end 18 thereof is disposed generally adjacent to wall 38 of cradle 30 as further illustrated in FIGS. 11-15. The act of inserting bait station 10 into cradle 30 with tab 24 folded over results in tab 24 being within slots formed by inverted L-shaped flanges 35 so as to pin and maintain the tab in position such that the entrance remains open. Additional features of cradle 30 include an enlarged base that functions to stabilize the bait station, an optional punch hole formed in base 32 to allow for insertion of a ground anchor or spike to further stabilize the assembly, and an optional recess for receiving a strip of adhesive to allow the bait station to be secured to a flat surface, such as a countertop or floor.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An insect bait station comprising:
   a bait cartridge;
   a cradle adapted to removably receive said cartridge inserted therein, said cradle defining a generally U-shaped structure when viewed from above, said cradle having a top, a bottom, opposing sides defining a closed end, and an opposing open end, said cradle top including at least one inwardly projecting flange;
   said cartridge defining an internal volume for containing insect bait, said cartridge having a bottom portion, an open top portion including a peripheral edge, said top portion peripheral edge including an end portion forming a tab, and a ramp originating in proximity to said top portion end portion and extending from said top portion downward to within said internal volume, said ramp terminating in proximity to said bottom portion;
   a sheet of flexible material sealingly affixed along said peripheral edge in covering relation with said open top portion;
   said tab including a recessed channel traversing a fold line that forms a frangible seal along the peripheral edge, said tab pivotable about said fold line from a non-activated configuration wherein said frangible seal is unbroken, to an activated configuration wherein said frangible seal is broken and an entrance tunnel to said internal volume is formed with said tab folded approximately 180-degrees from said non-activated configuration;
   said cradle insertedly receiving said cartridge in said activated configuration wherein said tab is maintained attached to said cartridge in said activated configuration by said at least one inwardly projecting flange.

2. An insect bait station according to claim 1, wherein said opposing sides and said closed end form generally inclined surfaces.

3. An insect bait station according to claim 1, wherein said cradle further includes a peripheral ridge formed on an upper portion thereof.

4. An insect bait station according to claim 1, wherein said sheet of flexible material and said cradle are fabricated from material which is UV resistant.

* * * * *